No. 884,380. PATENTED APR. 14, 1908.
R. F. HADLEY.
TRAP.
APPLICATION FILED JULY 6, 1907.
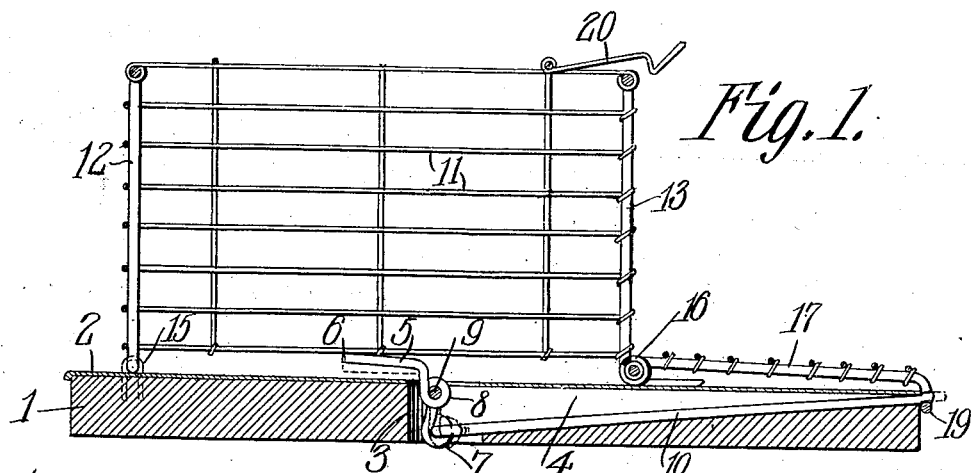
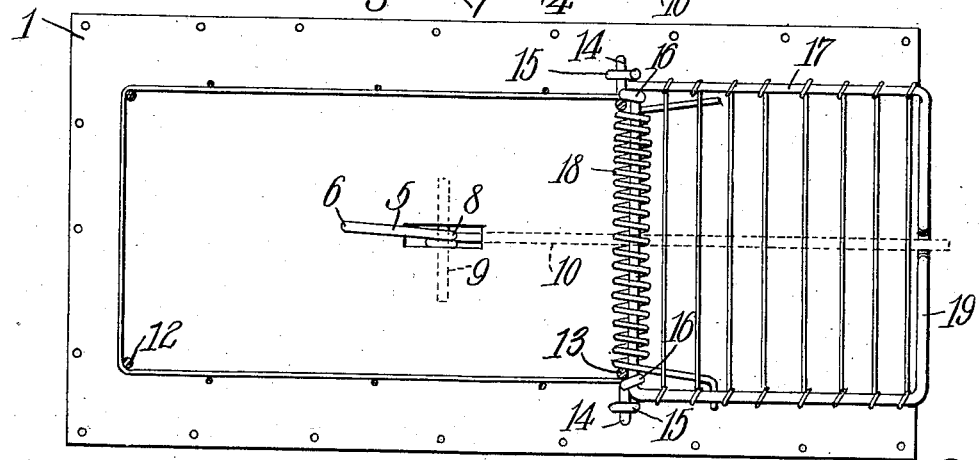
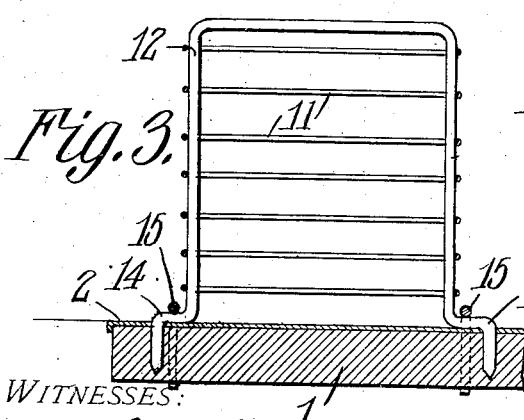
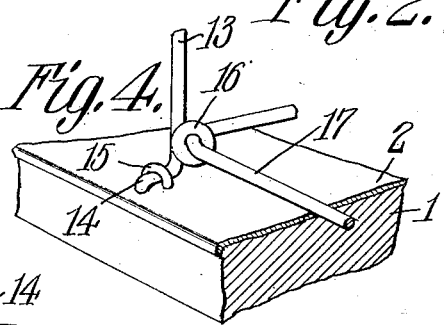
Richard F. Hadley,
INVENTOR.
By C. A. Snow & Co.
ATTORNEYS
WITNESSES:

UNITED STATES PATENT OFFICE.

RICHARD F. HADLEY, OF SLICKER, WEST VIRGINIA.

TRAP.

No. 884,380.     Specification of Letters Patent.     Patented April 14, 1908.

Application filed July 6, 1907. Serial No. 382,483.

*To all whom it may concern:*

Be it known that I, RICHARD F. HADLEY, a citizen of the United States, residing at Slicker, in the county of Tyler and State of West Virginia, have invented a new and useful Trap, of which the following is a specification.

This invention has relation to traps and it consists in the novel construction and arrangement of its parts as hereinafter shown and described.

The object of the invention is to provide a trap especially adapted to be used for catching rats and similar animals and it operates in such a manner as not to wound the animal and to catch several at a time.

The trap consists primarily of a base or platform, the upper surface of which is covered with sheet metal. A cage is mounted upon the platform and consists of end pieces provided with projecting points which are driven into the base, and shoulders which are forced against the side of a base and over which staples are passed which are driven into the base. The base is perforated approximately at its middle and is provided under the metal top thereof with a channel leading from said perforation to the end of the base. A pin is located transversely of the perforation and a trigger of peculiar configuration is mounted upon the pin. A rod is pivotally attached at one end to said trigger and passes through said channel and terminates in the vicinity of the end thereof. A spring actuated door is adapted to close one end of the cage. Said door swings upwardly and is provided at its upper edge with a notch which is adapted to receive the free end of said rod. A catch is mounted upon the cage and is adapted to engage the edge of the door for the purpose of holding the same positively in a closed position.

In the accompanying drawing:—Figure 1 is a longitudinal sectional view of the trap. Fig. 2 is a plan view of the trap partly in section. Fig. 3 is a transverse sectional view of the trap, and Fig. 4 is a detailed perspective view of a portion of the trap.

The trap consists of the base 1, the upper surface of which is covered by a piece of sheet metal 2. The base 1 is provided at or near its middle with a perforation 3 and is provided in its top and under the sheet 2 with a groove 4 which extends from the said perforation to the end of the base. The trigger 5 is made of wire and is provided with the substantially rectangularly disposed end portions 6 and 7, with the loop 8 located at the meeting ends thereof. The said loop surrounds a pin 9 which extends transversely across the perforation 3 of the base 1 and a registering opening is provided in the sheet 2 so that the portion 6 lies above the base and the portion 7 of the trigger 5 lies within the perforation 3. The portion 6 of the trigger 5 is adapted to impale and retain a bait. The rod 10 is pivotally attached at one end to the lower end of the portion 7 of the trigger 5 and lies within the groove 4. The rod 10 is longer than the said groove although as the trigger 5 is swung upon the pivot pin 9 the end of the said rod is drawn within the said groove.

The cage 11 is mounted upon the base 1 and consists of the end frame wires 12 and 13 each of which is provided with the shoulders 14 and each of which has its end driven into the base 1 with the shoulders resting directly against the top of the said base. The staples 15 are passed over the said shoulders and are also driven into the base. The frame wire 13 is provided at its lower portion with the loops 16 in which the door 17 is pivoted. The coil spring 18 bears at one end against the base 1 and at its opposite end against the door 17 and is under tension with a tendency to hold the said door closed against the frame 13. The upper or outer edge of the door 17 is provided with a bowed portion 19 which, when the door is open, lies beyond the end of the base 1 and is adapted to receive the end of the rod 10. The latch 20 is mounted upon the cage 11 and is adapted to engage the free edge of the door 17 when the same is closed against the frame 13 and positively holds the same in closed position.

From the foregoing description it is obvious that when the door 17 is open and the end of the rod 10 is inserted into the portion 19 that the said door will be held open against the tension of the spring 18. A suitable bait is then applied to the end portion 6 of the trigger 5. Thus the trap is set and in guiding or moving the rod 10 into engagement with the portion 19 of the door 17 the finger may be inserted in the perforation 3 and into engagement with the end of the said rod. It is obvious that the rod may be projected to a greater or less degree across the portion 19 of the door 17, thus, a trigger mechanism is provided which may be so adjusted as to require great or slight stress to operate the same. The solid lines in Fig. 1 of the drawing show the position of the trigger 5 when set to be operated by slight stress, while the dotted line indicates the position of the said trigger when set to be operated by greater stress. When the door 17 is held open as above described the animals one or more in number will enter the cage 11 and seize the bait impaled upon the trigger 5. The trigger is thereby moved or swung upon the pivot pin 9 and the rod 10 is moved longitudinally, whereby, its free end is disengaged from the bowed portion 19 of the door 17 and the spring 18, being under tension will close the said door against the frame 13 of the cage. Should an animal be on the door at the time that it is closing the animal will be forced or carried into the cage 11. In entrapping the animal it will be seen that they are not mutilated or wounded and thus the trap will not become blood tainted which would prevent successful operation of the same at future times.

Having described my invention what I claim as new and desire to secure by Letters-Patent is:—

1. A trap comprising a base having a perforation and a groove leading from said perforation to its edge, a trigger pivoted in said perforation, a rod pivoted to said trigger and traversing the length of the groove of said base, a cage mounted upon the base and inclosing one end of said trigger and a spring actuated door adapted to close said cage and having an end adapted to be engaged by the rod for holding the door open against the tension of its spring.

2. A trap comprising a base, a trigger mechanism and retaining rod mounted thereon and operatively connected together, a cage mounted upon the base and having frame wires provided with shoulders, the ends of said wires being driven into the base and the shoulders bearing against the surface of the base, staples passing over said shoulders and entering the base and a spring actuated door pivotally connected with one of the frame wires and adapted to be engaged by the retainer rod whereby it is held open against the tension of the spring.

3. A trap comprising a base, a trigger pivotally mounted thereon, a retainer rod operatively connected with the trigger, a cage mounted upon the base, a spring actuated door adapted to close the cage and being hinged thereto, said door having at its free edge a bowed portion which, when the door is open lies beyond the edge of the base and which receives the retainer rod whereby the door is held open against the tension of its spring.

In testimony that I claim the foregoing as my own, I have hereto affixed my signature in the presence of two witnesses.

RICHARD F. HADLEY.

Witnesses:
C. L. HENDERSON.
J. E. MARTIN.